M. A. REPLOGLE.
TIRE FINISHING MECHANISM.
APPLICATION FILED OCT. 17, 1918.
1,385,975.
Patented July 26, 1921.
2 SHEETS—SHEET 2.
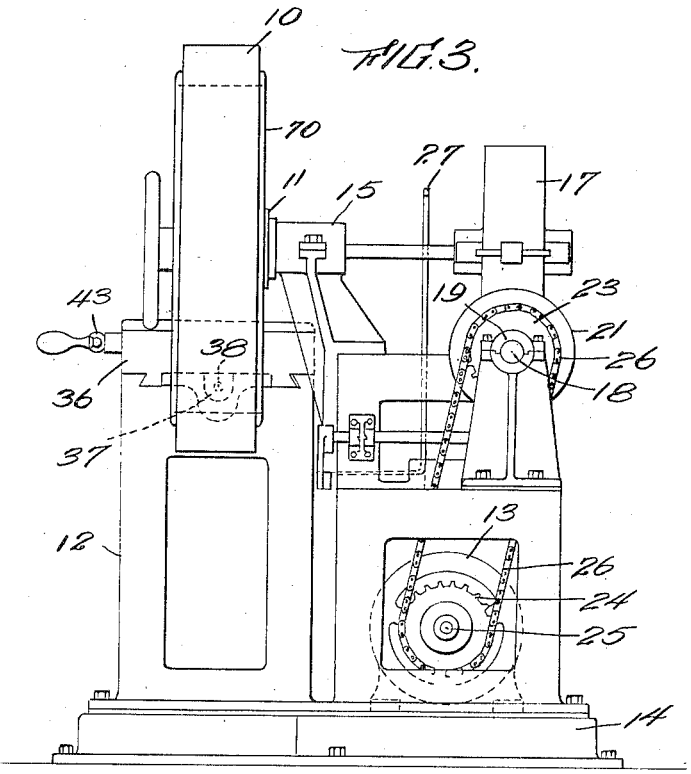
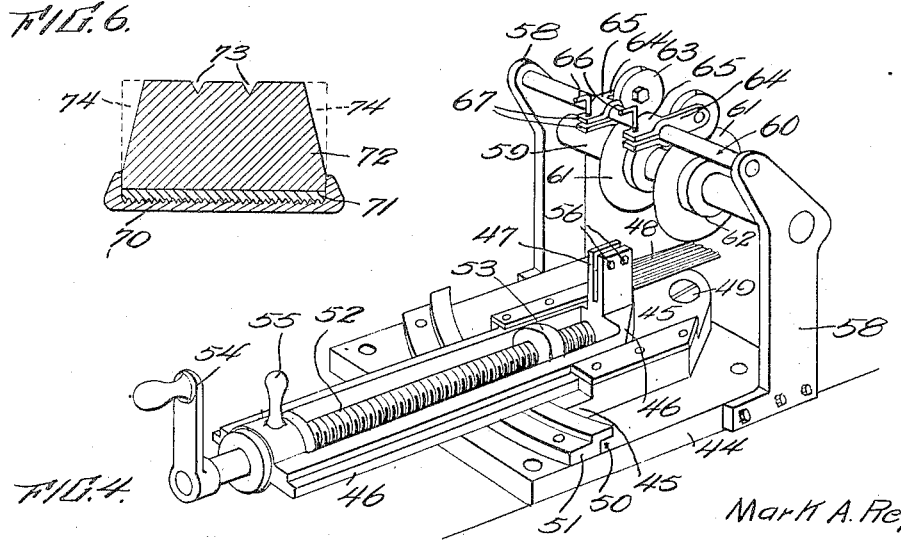
Inventor
Mark A. Replogle
By
his Attorney

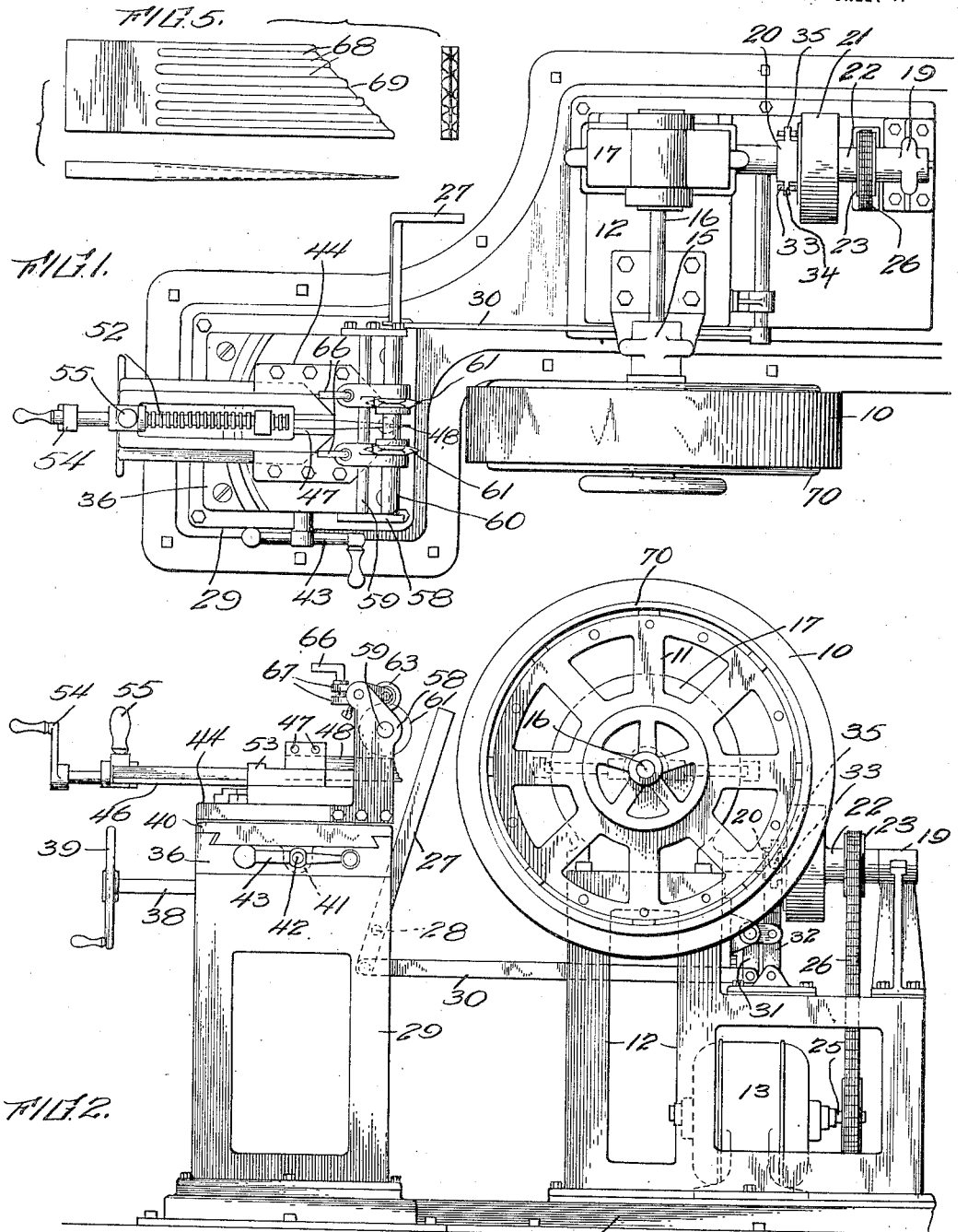

UNITED STATES PATENT OFFICE.

MARK A. REPLOGLE, OF AKRON, OHIO, ASSIGNOR TO THE GOODYEAR TIRE & RUBBER COMPANY, OF AKRON, OHIO, A CORPORATION OF OHIO.

TIRE-FINISHING MECHANISM.

1,385,975.  Specification of Letters Patent.  Patented July 26, 1921.

Application filed October 17, 1918. Serial No. 258,641.

*To all whom it may concern:*

Be it known that I, MARK A. REPLOGLE, a citizen of the United States, and resident of Akron, Ohio, have invented new and useful Improvements in Tire-Finishing Mechanism, of which the following is a specification.

My present invention relates to the construction of solid tires; and it has for its principal object the provision of an apparatus for notching and trimming the tread and side wall portions thereof.

More specifically, my invention contemplates the provision of means for rotating a solid tire, in conjunction with adjustable means for moving against the rotated tire suitable devices adapted to notch and trim the tire.

The above and additional objects of a similar nature, which will be hereinafter more specifically treated, are preferably accomplished by such means as are illustrated in the accompanying drawings, described in the following specification, and then more specifically pointed out in the claims which are appended hereto and form a part of this application.

With reference to the drawings, wherein there has been illustrated a preferred embodiment of the invention, and throughout the several views of which similar reference numbers designate corresponding parts;

Figure 1 is a plan view of the apparatus;

Fig. 2 is a side elevational view;

Fig. 3 is a rear end elevational view;

Fig. 4 is a fragmentary perspective view showing the adjustable mounting of the devices for notching and trimming the tires;

Fig. 5 shows side elevational, end elevational, and bottom plan views of the cutting blades; and Fig. 6 is a cross sectional view of the notched and trimmed solid tire.

The means for rotating the solid tire preferably consist of a chuck 11 rotatably mounted on a supporting frame 12, and has connections whereby it can be operated by an electric motor 13 or other suitable motive device. The supporting frame 12 is mounted on a base plate 14 and has thereon bearings 15 for a shaft 16 supporting the chuck 11. The shaft 16 is connected by worm gearing 17 to a shaft 18 which is mounted in a bearing 19 at one end, and connected to one member 20, of a friction clutch at the opposite end. The other member 21 of the clutch is secured to a sleeve 22 which latter is mounted on the shaft 18 and has thereon a sprocket wheel 23, around which, and a sprocket wheel 24 carried on a shaft 25 of a motor 13, passes a sprocket chain 26.

The clutch member 20 is splined on the shaft 18 and may be moved into or out of engagement with the clutch member 21 to effect, or stop, rotation of the chuck 11—by means of an operating lever 27 which is mounted on a pivot 28 on a supporting frame 29, and is pivotally connected to one end of a link 30, which has its other end pivotally connected to one end of a bell-crank lever 31. The bell-crank 31 is pivotally mounted on the supporting frame 12 and has its other end pivotally connected to the central portion of an arm 32 which is pivotally connected to the supporting frame 12. The arm 32 has at its upper end a yoke 33 provided with slots 34 into which extend pins 35 projecting from the sides of the clutch member 20.

The supporting frame 29 is mounted on the base 14 and is arranged adjacent to the supporting frame 12, and it has slidably mounted thereon the carriage 36 which is movable in alinement with the plane of the chuck 11 and the solid tire 10. The carriage 36 has on its under side a threaded projection 37 into which is fitted a screw 38 which has at one end a hand wheel 39, adapted to effect movement of the carriage 36, toward or away from the solid tire 10. A table 40 is mounted to slide transversely on the carriage 36, and it also has on its under side a threaded projection 41, into which is fitted a screw 42, upon which is mounted a handle 43, whereby it can be turned to effect movement of the table 40, in either direction transversely of the solid tire 10.

The table 40 is provided with a horizontal top plate 44, which carries the devices for trimming and notching the solid tire 10, upon which is pivotally mounted a guide 45 for a slide 46 having thereon a split upright extension 47 for holding a cutting or trimming blade 48. The guide 45 has its forward end portion connected to a pivot 49 on the plate 44, and it has its rear end portion extending into a groove 50, in a curved bar 51, mounted on the top plate 44 and also upon which rests the slide 46.

A screw 52 is mounted on the slide 46 and is connected to a threaded lug 53, on the guide 45, so that by turning the screw 52, by means of a handle 54, the slide 46 can be adjusted to move the blade 48 against or away from the solid tire 10. The blade 48 is held in a rigid manner in the bifurcated end of the upright extension 47, by means of adjusting screws 56, which project through the bifurcations above the knife. A handle 55 is provided on the slide 46, so that it, together with the guide 45, may be swung on its pivot 49, to dispose the blade 48 at an angle to the plane of the chuck 11.

At its forward end the top plate 44 is provided with upright supports 58, between the upper end portions of which extend cross bars 59 and 60. On the cross bar 59 are mounted notching disks 61, which, as shown, have tapered or edged peripheral portions 62. The notching disks 61 are held in adjusted position on the bar 59 by grooved rollers 63, which contact with the peripheral portions of the disks 61, and are mounted on arms 64 of sleeves 65 slidably mounted on the bar 60. The sleeves 65, are held in adjusted position by screws 66, which connect the split extensions 67 of the sleeves.

As shown more clearly in Fig. 5, the blade 48 has its forward portion fluted and beveled longitudinally as at 68, and the forward edge portion 69 of the blade is cut off at an angle to the main axis.

The solid tire 10, as shown in this instance, comprises a channeled metal base ring 70, a thin layer of rubber 71, stitched down upon the base ring, and a thick layer of rubber 72, applied by any suitable means over the first layer, forming the thick tread portion of the tire. In operation the base ring 70 is placed upon the chuck 11 and the trimming and notching operations are performed on the tread portion 72 of the tire while it is preferably in a warm condition.

From the foregoing it will be seen that the lever 27 may be operated to cause engagement of the clutch members 20 and 21 and consequently effect rotation of the chuck 11 with the solid tire 10 thereon; whereupon the notching disks 61 on the bar 59 may be adjusted through adjustment of the sleeves 65 on the bar 60, and the table 40 can be adjusted by turning the handle 43, to dispose the notching disks 61 in proper alinement with the plane of the chuck 11 and the tire 10. Then the carriage 36 can be operated by turning the hand wheel 39, to move the disks 61 against the tread portion of the tire 10 to form notches 73 in the peripheral or tread portion of the tire. In trimming the sides of the solid tire 10 to form the bevels 74 thereon, the table 40 and the carriage 36 may be adjusted to dispose the cutting edge 69 of the blade 48 in proper position adjacent to the periphery of the tire, then the slide 46 and the guide 45 are turned by the handle 55 until the blade is at the proper angle to the plane of the tire, and then by turning the handle 54 to turn the screw 52, the slide 46 is moved and the blade 48 is fed against the rubber material 72 to trim the side of the tire and form the bevel 74.

What I claim is:

1. In apparatus of the character specified, a tire trimming blade having its forward portion beveled longitudinally and provided with longitudinal flutings, the forward edge portion of the blade being inclined forwardly downwardly.

2. In apparatus of the character specified, the combination of means for rotating a tire, an adjustably mounted table, a slide carried by said table, a cutting blade carried by said slide, means permitting adjustment of the slide to dispose the cutting blade at an angle to the plane of the tire, means to operate the slide to move said blade against the rotating tire to trim the tire, a bar carried by said table, notching disks slidably mounted on said bar, means carried by said table for holding the notching disks in adjusted position, and means to move said table to move the disks against the tire to form notches in the periphery of the tire.

3. In apparatus of the character specified, the combination of means for rotating a tire, an adjustably mounted table, a slide carried by said table, a cutting blade carried by said slide, means permitting adjustment of said slide to dispose the cutting blade at an angle to the plane of the tire, means to move the slide to move said blade against the tire to trim the tire, adjustably mounted notching disks carried by said table, and means to move said table to move the disks against the tire to form notches in the tread portion of the tire.

4. In a tire finishing machine the combination with a rotatable tire supporting chuck and a notching mechanism of, a carriage supporting the notching mechanism and adjustable toward or away from the periphery of the chuck, trimming mechanism mounted upon the carriage and comprising a cutter element and a mounting therefor swingable transversely of the chuck, means for reciprocating the cutter mounting upon the carriage, and means for adjusting the carriage transversely of the chuck to position the trimming mechanism on either side of said chuck.

5. In a tire finishing machine the combination with a rotatable tire supporting chuck and a notching mechanism of, a carriage supporting the notching mechanism and adjustable horizontally toward or away from the periphery of the chuck, a trimming mechanism mounted upon the carriage and comprising a cutter element and a mounting therefor swingable transversely of the chuck in a horizontal plane, means for reciprocating the cutter mounting upon the carriage, and means for adjusting the carriage transversely of the chuck to position the trimming mechanism upon either side of said chuck.

In witness whereof, I have hereunto signed my name in the presence of two subscribing witnesses.

MARK A. REPLOGLE.

Witnesses:
R. S. TROGVEN,
E. C. LEADENHAM.